United States Patent
Hasegawa et al.

(10) Patent No.: US 6,830,384 B2
(45) Date of Patent: Dec. 14, 2004

(54) OPTICAL FIBER MODULE

(75) Inventors: Junichi Hasegawa, Tokyo (JP); Tsunetoshi Saito, Tokyo (JP); Kanji Tanaka, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 72 days.

(21) Appl. No.: 10/352,924

(22) Filed: Jan. 29, 2003

(65) Prior Publication Data

US 2003/0161594 A1 Aug. 28, 2003

(30) Foreign Application Priority Data

Jan. 29, 2002 (JP) .......................................... 2002-020379
Jan. 29, 2002 (JP) .......................................... 2002-020380
Feb. 7, 2002 (JP) .......................................... 2002-031035

(51) Int. Cl.[7] ................................................ G02B 6/36
(52) U.S. Cl. ............................................ 385/92; 385/24
(58) Field of Search ................................. 385/14, 24, 49, 385/88–94

(56) References Cited

U.S. PATENT DOCUMENTS 6,181,864 B1 * 1/2001 Jang et al. ................. 385/92 X
6,735,353 B2 * 5/2004 Hirata et al. .................. 385/14

FOREIGN PATENT DOCUMENTS

JP 11-14844 1/1999

* cited by examiner

Primary Examiner—Phan T. H. Palmer

(57) ABSTRACT

An optical fiber module of the invention is a small-sized optical fiber module with small electric power consumption in which the characteristics are hardly deteriorated in association with environmental changes. The optical fiber module has a package, an optical component housed inside the package, and optical component holding parts disposed between the optical component and the package for holding the optical component. The configuration of holding the optical component by the optical component holding parts has a configuration of reducing heat conduction for reducing the heat conduction between the optical component and the package. The configuration of reducing heat conduction is such that the optical component holding parts hold the optical component in line contact.

21 Claims, 13 Drawing Sheets

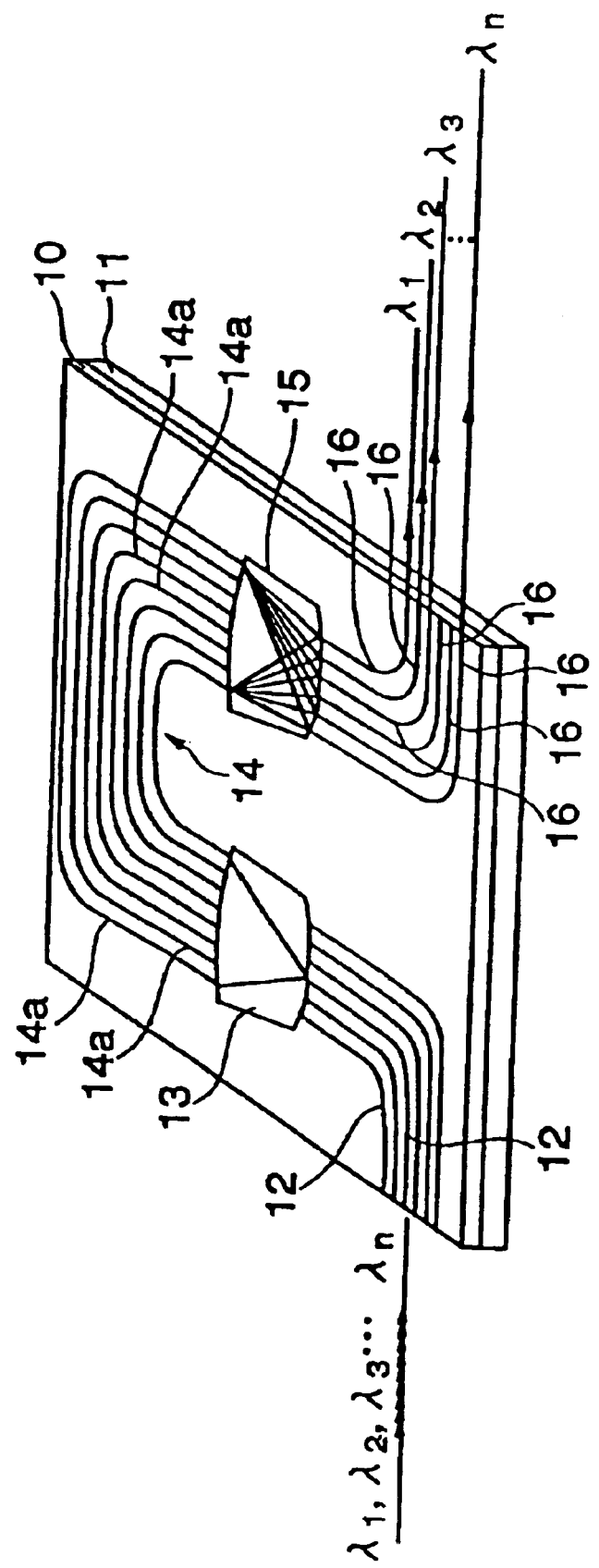

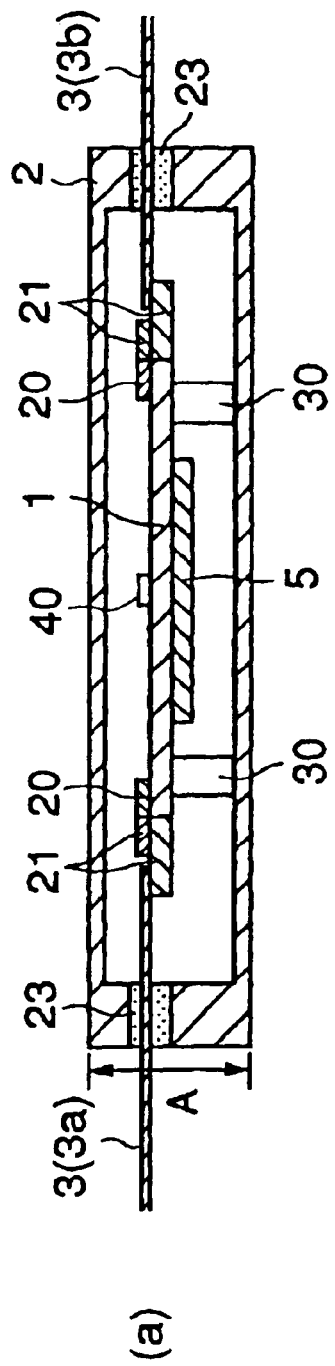
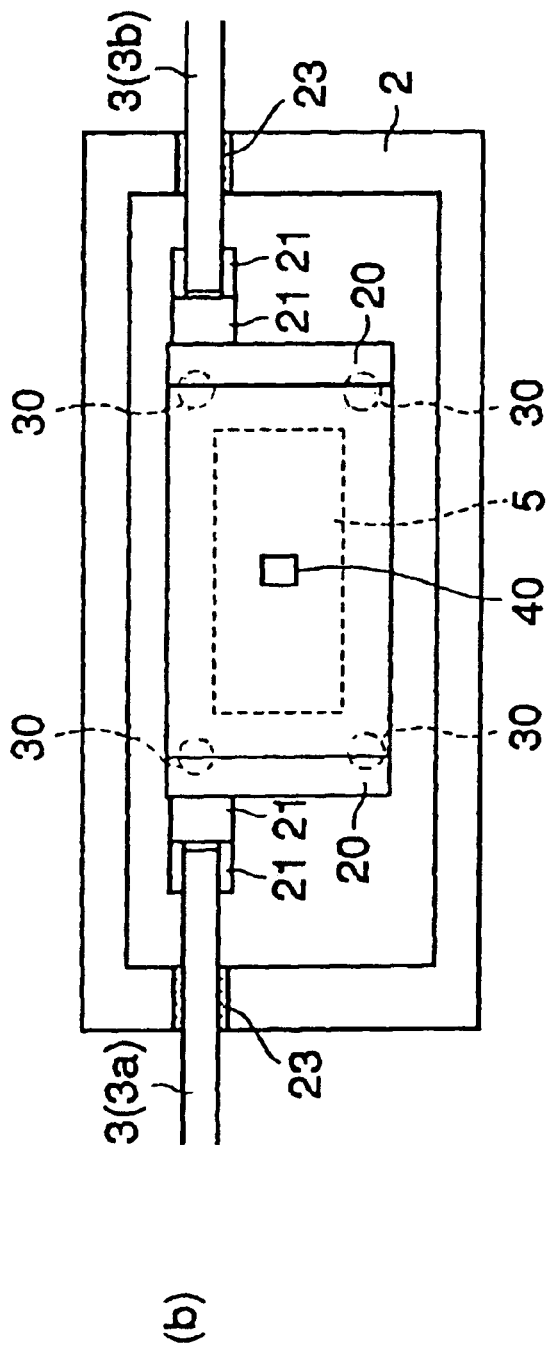

OPTICAL FIBER MODULE

BACKGROUND OF THE INVENTION

1. Field of the Invention

The invention relates to an optical fiber module.

2. Discussion of the Background

Optical components having the functions of beam splitting, optical switching, and wavelength multipelxing and demultiplexing have been widely used in optical communications. The optical components are formed variously, but among them, the optical components having an optical waveguide circuit in which a circuit formed of optical waveguides is formed over a substrate have been prospective in view of the integration and mass production.

Traditionally, the optical waveguide circuit has been formed in which the circuit of optical waveguides made of a silica-based material is disposed on a silicon or silica substrate. In recent years, however, the optical waveguide circuits have been also formed in which a substrate and an optical waveguide forming region are formed of polyimide-based materials.

FIGS. 10 and 11 are diagrams illustrating examples of the optical waveguide circuits. In the optical waveguide circuits, a waveguide forming region 10 is formed over a substrate 11.

FIG. 10 illustrates an exemplary configuration of the optical waveguide circuit formed with a 1×8 waveguide beamsplitter as the circuit formed of optical waveguides. FIG. 11 illustrates an exemplary configuration of the optical waveguide circuit formed with a circuit of an arrayed waveguide grating as the circuit formed of optical waveguides. The arrayed waveguide grating is used for wavelength division multiplexing. Various circuit configurations have been proposed therefor.

As shown in FIG. 10, the 1×8 waveguide beamsplitter has one input optical waveguide 12 and eight output optical waveguides 16. A plurality of splitting parts 17 are formed between the input optical waveguide 12 and the output optical waveguides 16.

As shown in FIG. 11, the circuit of the arrayed waveguide grating has at least one input optical waveguide 12, a first slab waveguide 13 connected to the output end of the input optical waveguide 12, an array waveguide 14 connected to the output end of the first slab waveguide 13, a second slab waveguide 15 connected to the output end of the array waveguide 14, and a plurality of output optical waveguides 16 arranged side by side that is connected to the output end of the second slab waveguide 15.

The array waveguide 14 transmits the light lead out of the first slab waveguide 13, which are formed to arrange a plurality of channel waveguides 14a side by side. The lengths of the adjacent channel waveguides 14a are varied at a set amount (ΔL) each other.

The channel waveguides 14a forming the array waveguide 14 are usually disposed in plurals such as a hundred waveguides. The output optical waveguides 16 are disposed corresponding to the number of signal lights demultiplexed or multiplexed by the arrayed waveguide grating, for example, the signal lights have wavelengths different from each other. However, in FIG. 11, the numbers of each of the channel waveguides 14a, the output optical waveguides 16 and the input optical waveguides 12 are illustrated simply for simplifying the drawing.

For example, as shown in FIG. 11, when wavelength-multiplexed lights are lead into one input optical waveguide 12 in the circuit of the arrayed waveguide grating, the wavelength-multiplexed lights pass through the input optical waveguide 12, and they are lead into the first slab waveguide 13. Then, the wavelength-multiplexed lights spread by the diffraction effect of the first slab waveguide 13, enter the array waveguide 14, and transmit through the array waveguide 14.

The lights transmitted through the array waveguide 14 reach the second slab waveguide 15, and focus on the output optical waveguides 16 for output. However, the lengths of all the channel waveguides 14a of the array waveguide 14 are varied from each other, and thus a shift is generated in the separate light phases after transmitted through the array waveguide 14. Then, the phasefront of the focusing lights is titled according to the shift amount, and the tilted angle determines the focusing position. Therefore, the lights having wavelengths different from each other can be outputted from the different output optical waveguides 16.

For example, as shown in FIGS. 12A to 12C, an optical component 1 having the optical waveguide circuit with the circuit of the arrayed waveguide grating or the waveguide beamsplitter is housed inside a package 2, and it is used as an optical fiber module. FIG. 12A is a perspective view illustrating the appearance of the optical fiber module. FIG. 12B is a diagram of the optical fiber module that the inside is seen from above. FIG. 12C is a cross-section of a line A—A shown in FIG. 12B.

The optical fiber module shown in FIGS. 12A, 12B and 12C has a first optical fiber 3 (3a) and a second optical fiber 3 (3b). The first optical fiber 3 (3a) is connected to one end side of the optical component 1, and the second optical fiber 3 (3b) is connected to the other end side of the optical component 1. One end sides of the optical fibers 3 (3a and 3b) are connected to the optical component 1, and the other end sides are drawn out of the package 2. The optical fibers 3 (3a and 3b) are fixed to the package 2 with an adhesive 23.

The first and second optical fibers 3a and 3b are formed of optical fiber ribbons, for example, having a plurality of optical fibers arranged side by side. An optical fiber array 21 is disposed at the connection end face of the optical fiber ribbon. The connection of the first and optical fibers 3a and 3b to the optical component 1, that is, the connection of the optical fiber arrays 21 to the optical component 1 is fixed with the adhesive.

In addition, lids 20 are attached to the connection end faces of the optical component 1, which allow stable connection of the optical component 1 to the optical fiber arrays 21 at the end parts of the first and optical fibers 3a and 3b.

The package 2 has a package main body 2a and a cover part 2b. The package 2 is mainly formed of metals such as aluminum and stainless steel or plastics. The package 2 houses the optical component 1 and the connecting parts of the optical component 1 to the optical fibers 3 (3a and 3b) inside the package 2, whereby protecting them.

The optical fiber module is supposed to be used in the temperature range from 0 to 70° C., for example. Therefore, the optical fiber module is demanded not to vary the characteristics in the range of temperature for use. Accordingly, for the optical component 1 being greatly affected in the optical characteristics by temperature changes including the arrayed waveguide grating, temperature control is needed. Furthermore, the range of temperature for use in the optical fiber module is the range from ~5 to 65° C., 0 to 65° C., and 0 to 55° C.

Then, in the optical fiber module shown in FIGS. 12A to 12C, an optical fiber module having a temperature control device (not shown) disposed inside the package 2 is proposed. The optical fiber module adapts a method that the optical component 1 is heated and kept at constant values at temperatures of 70 to 80° C., for example, by the temperature control device. For the optical fiber module disposed with the temperature control device, it is demanded to reduce the electric power consumption of the temperature control device as small as possible. For example, the optical fiber module is demanded to reduce the maximum electric power consumption to five watts or below in the range of temperature for use.

In order to realize the reduced electric power consumption, various package structures have been devised. For example, an invention titled by METHOD FOR PACKAGING HEATER-HEATED OPTICAL WAVEGUIDE AND ITS PACKAGE is proposed in a Japanese Patent Application (JP-A-11-014844). The proposal submits the configuration that an optical component is floated and housed inside a package interposing one to four poles. The proposal forms the thickness of the package to be 22 mm, satisfying the electric power consumption of a heater at five watts or below.

The proposal submits a method that the area of the surface to fix the poles is set to 0.03 to 1.0 cm$^2$, and the contact area of the optical component to the poles and the contact area of the poles to the package are reduced, whereby the electric power consumption of the heater is reduced.

In the meantime, the optical fiber modules built in an optical communication system unit is demanded to reduce the dimensions (thickness). Then, to meet the demand, the inventor decided to fabricate the optical fiber module of a following sample fabrication 1 as shown in FIG. 13 in which the thickness of the package 2 (A shown in FIG. 13) was reduced to 12 mm below being the requirement of the system side.

The optical fiber module of the sample fabrication 1 is the optical fiber module adapting the configuration of the proposal, which is formed to overlay an optical component 1, a heat spreading plate 22, and a temperature control device 5 one by one. The temperature control device 5 is formed of a heater.

A resistance temperature device is mounted on the heat spreading plate 22. The resistance temperature device is disposed for sensing the temperatures of the optical component 1. On the lower side of the heat spreading plate 22, poles 30 are disposed at four corners. The thickness of the air space between the top face of the optical component 1 and the cover part 2b of the package 2 (B shown in FIG. 13) is two millimeters. In addition, the thickness of the air space between the bottom face of the heat spreading plate 22 and the package main body 2a of the package 2 (B' shown in FIG. 13) is two millimeters as well.

Table 1 shows the component configuration of the optical fiber module of the sample fabrication 1. In Table 1, the resistance of the resistance temperature device is a value at a temperature 0° C., and the size of the pole indicates the contact area of the top face of a single pole 30 to the heat spreading plate 22.

TABLE 1

| Component | Size | Remark |
| --- | --- | --- |
| Heater | 35 × 15 × 1 (mm) | 3 ohms |
| Resistance temperature device | 1.5 × 1 × 0.5 (mm) | 100 ohms material: platinum |

TABLE 1-continued

| Component | Size | Remark |
| --- | --- | --- |
| Heat spreading plate | 60 × 30 × 1 (mm) | Material: aluminum |
| Pole | 0.2 (cm$^2$)/single pole | Material: fluorine-based resin, four poles |
| Package | 127 × 58 × 12 (mm) | Material: polyethylene terephthalate |

In the sample fabrication 1, the package 2 was formed of polyethylene terephthalate (PET) resin having small thermal conductivity. The inventor thought that this configuration would allow reducing the ratio of the heat in the optical component 1 to be released out of the package 2 to decrease the electric power consumption of the temperature control device, the optical component 1 being heated by the temperature control device such as the heater.

The electric power consumption of the temperature control device 5 in the optical fiber module of the sample fabrication 1 was measured, and the electric power consumption was 5.31 W where the ambient temperature was set at a temperature of 0° C. and the preset temperature of the optical fiber module was set at a temperature of 80° C. The electric power consumption value exceeded five watts demanded by the system side.

In addition, even in the configuration shown in FIG. 13, the electric power consumption can be reduced to five watts or below when the thickness of the air space inside the optical fiber module is thickened without changing the wall thickness of the package main body 2a and the cover part 2b of the package 2. More specifically, when the thickness of the air space between the top face of the optical component 1 and the package 2 (B shown in FIG. 13) and the thickness of the air space between the bottom face of the heat spreading plate 22 and the package 2 (B' shown in FIG. 13) are set to seven millimeters, the electric power consumption can be reduced to five watts or below.

However, the optical fiber module having formed the B and B' shown in FIG. 13 to be seven millimeters has a greater thickness of 22 mm. Accordingly, the optical fiber module cannot satisfy the demand of scaling down by the system side, that is, the demand is that the thickness of the package 2 shown in A in FIG. 13 is reduced to 12 mm or below.

To further reduce the electric power consumption, the inventor fabricated a sample fabrication 2 in the configuration of the proposal in which the heat spreading plate 22 between the optical component 1 and the temperature control device 5 was omitted as the traditional dimensions (the package thickness of 22 mm) were not changed. The optical fiber module of the sample fabrication 2 has the configuration shown in FIGS. 14A and 14B.

A temperature control device 5 is disposed on the lower side of an optical component 1. Here, the temperature control device 5 is formed of a heater. A temperature sensing element 40 for sensing the temperatures of the optical component 1 is disposed on the upper side of the optical component 1. The temperature sensing element 40 is formed of a resistance temperature device.

The component configuration of the optical fiber module of the sample fabrication 2 illustrated in FIGS. 14A and 14B is as shown in Table 2. In the sample fabrication 2, the contact area of the poles 30 to the optical component 1 and the contact area of the poles 30 to the package 2 were decreased, and the amount of heat conduction from the optical component 1 to the package 2 side was reduced. Accordingly, the electric power consumption of the temperature control device 5 was allowed to be 4.2 W.

TABLE 2

| Component | Size | Remark |
|---|---|---|
| Heater | 35 × 15 × 1 (mm) | 3 ohms |
| Resistance temperature device | 1.5 × 1 × 0.5 (mm) | 100 ohms<br>Material: Platinum |
| Pole | 0.2 (cm$^2$)/single pole | Material: fluorine-based resin, four poles |
| Package | 127 × 58 × 22 (mm) | Material: polyethylene terephthalate |

In Table 2, the resistance of the resistance temperature device is the value at a temperature of 0° C., and the size of the pole is the contact area of the top face of a single poles 30 to the optical component 1. The measured value of the electric power consumption of the temperature control device 5 is the maximum electric power consumption where the ambient temperature was set to 0 to 70° C., and the preset temperature of the optical fiber module was set to 70 to 80° C.

However, in the configuration of the optical fiber module of the sample fabrication 2, an impact applied to the package 2 was directly transmitted to the optical component 1 through the poles 30. Thus, there has been a problem that the impact strength is weak.

For example, the inventor conducted the impact test to the optical fiber module of the sample fabrication 2 that an impact was applied to the optical fiber module for 500G×5 times in the three-axial directions orthogonal to each other. As shown in Table 3, the optical component 1 had cracks or the optical component 1 was broken in every sample of the sample fabrication 2.

TABLE 3

| Sample No. | Insertion loss (dB) | Conditions of optical components |
|---|---|---|
| 1 | 0.29 | Cracks |
| 2 | — | Damaged (cracks) |
| 3 | — | Damaged (cracks) |
| 4 | — | Damaged (cracks) |
| 5 | 0.58 | Cracks |

It is essential that the optical component as a product must clear the reliability test (here, the impact test (500G×5 times)), and the optical fiber module with the damaged optical component 1 cannot be used. Moreover, the optical fiber modules having cracks in the optical component 1 have great variations in the insertion loss, and they cannot be used as well. As described above, it has been a serious problem that the optical fiber module has weak impact strength.

The optical fiber module is also demanded that the optical characteristics such as insertion loss are not to be varied even though the optical fibers 3 (3a and 3b) are pulled. However, in the traditional optical fiber modules, the optical fibers 3 (3a and 3b) are fixed to the package 2 with the adhesive 23. When the optical fibers 3 (3a and 3b) are pulled, a stress is applied to the optical fibers 3 (3a and 3b) and the connecting parts of the optical fibers 3 (3a and 3b) to the optical component 1 inside the package 2.

The package 2 of the optical fiber module is formed of materials having a greater thermal expansion coefficient such as metals and plastics, which is greatly expanded and contracted by temperature changes more than the configuration members of the optical component 1 and the optical fibers 3 (3a and 3b). Then, with this expansion and contraction, a stress is applied to the optical fibers 3 (3a and 3b) fixed to the package 2. This stress is also applied to the optical component 1 bonded and fixed to the optical fibers 3 (3a and 3b).

When it is done, the influence of the stress has particularly caused an increase in the insertion loss of the connecting parts of the optical component 1 to the optical fibers 3 (3a and 3b).

Because of the applied stress, the connecting parts of the optical component 1 to the optical fibers 3 (3a and 3b) might be damaged, and the optical component 1 might be peeled off from the heat spreading plate 22 according to the circumstances in the configuration of disposing the heat spreading plate 22 as the sample fabrication 1. Therefore, in the traditional optical fiber modules, problems have arisen that the performance is deteriorated by repeating temperature changes and lifetime is shortened.

The inventor observed that the humidity resistance characteristics of the optical fiber modules were not excellent when the package 2 was formed of polyethylene terephthalate resin having small thermal conductivity in order to reduce the electric power consumption of the temperature control device 5 as the optical fiber modules of the sample fabrications 1 and 2.

More specifically, it was revealed that when the package 2 formed of polyethylene terephthalate resin is placed under a high temperature, high humidity environment, the package 2 is deteriorated to affect the characteristics of the optical component 1 inside the package 2.

For example, the inventor allowed the optical fiber module shown in FIGS. 12A to 12C to stand under an environment at a temperature of 85° C. at a humidity of 85% for 2000 hours. Consequently, cracks were generated in the package 2 after 2000 hours as shown in Table 4.

TABLE 4

| Material | Conditions after the wet heat test | Thermal conductivity (W/(m · K)) | Water absorption (%) |
|---|---|---|---|
| PET resin | Cracks | 0.31 to 0.51 | 0.1 to 0.22 |
| ABS copolymer | Cracks | 0.17 | 0.2 to 0.45 |
| Polyacetal resin | Cracks | 0.25 | 0.22 |
| Paper bakelite | Cracks | 0.29 | 1.4 |

As shown in Table 4, when the packages 2 were formed of ABS (acrylnitrile-butadiene-styrene) copolymer, polyacetal resin, and paper bakelite, the same results were obtained. More specifically, the packages 2 formed of these materials were allowed to stand under the environment at a temperature of 85° C. at a humidity of 85% for 2000 hours, and then cracks were generated after 2000 hours.

As described above, when the cracks are generated in the package 2 under the high temperature, high humidity environment, the characteristics of the optical component 1 inside the package 2 are deteriorated, which causes a serious problem.

SUMMARY OF THE INVENTION

In one aspect, the invention is to provide a following optical fiber module. More specifically, the optical fiber module of the invention has:

a package;

an optical component housed inside the package; and optical component holding parts disposed between the optical component and the package for holding the optical component, wherein a configuration of holding the optical component by the optical component holding part has a configuration of reducing heat conduction for reducing the heat conduction between the optical component and the package.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 11 is an explanatory view illustrating an example of the optical waveguide circuit having the circuit of the arrayed waveguide grating;

FIG. 14A is an explanatory view illustrating the optical fiber module of the sample fabrication 2 fabricated by the inventor by a cross-section; and FIG. 14B is a plan view illustrating the optical fiber module shown in FIG. 14A where the inside is seen.

DESCRIPTION OF THE EMBODIMENTS

As one aspect, the invention is to provide a small-sized optical fiber module with small electric power consumption in which the characteristics are hardly deteriorated in association with environmental changes, for example. Here, the characteristic deterioration due to environmental changes is the characteristic deteriorations caused by a tensile stress applied to the optical fibers connected to the optical component of the optical fiber module from the outside of the package, by an influence, by impact, due to expansion and contraction of the package due to heat associated with changes in temperature for use, and by moisture absorption of the package.

Hereafter, the embodiments of the invention will be described with reference to the drawings. In addition, in the description of the following embodiments, the portions having the same designations as the traditional examples are designated the same numerals and signs, omitting or simplifying the overlapping description.

Figure 1A:
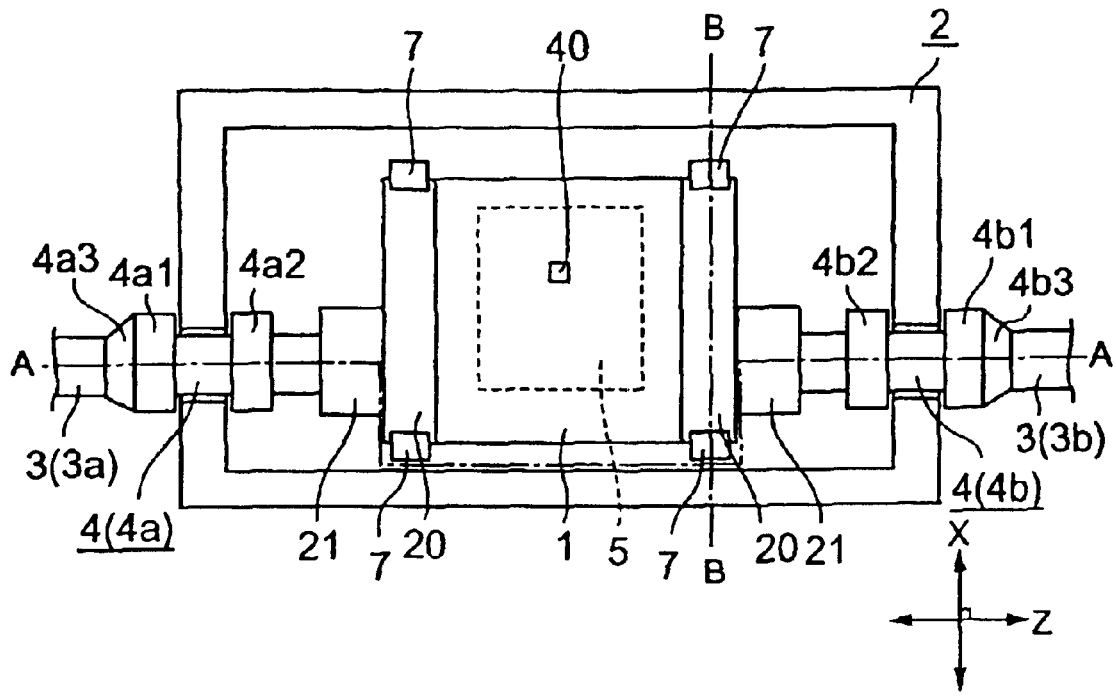
FIG. 1A is a plan view illustrating the configuration of the main part of a first embodiment of the optical fiber module in the invention by the drawing where the inside is seen from above.
Figure 1B:
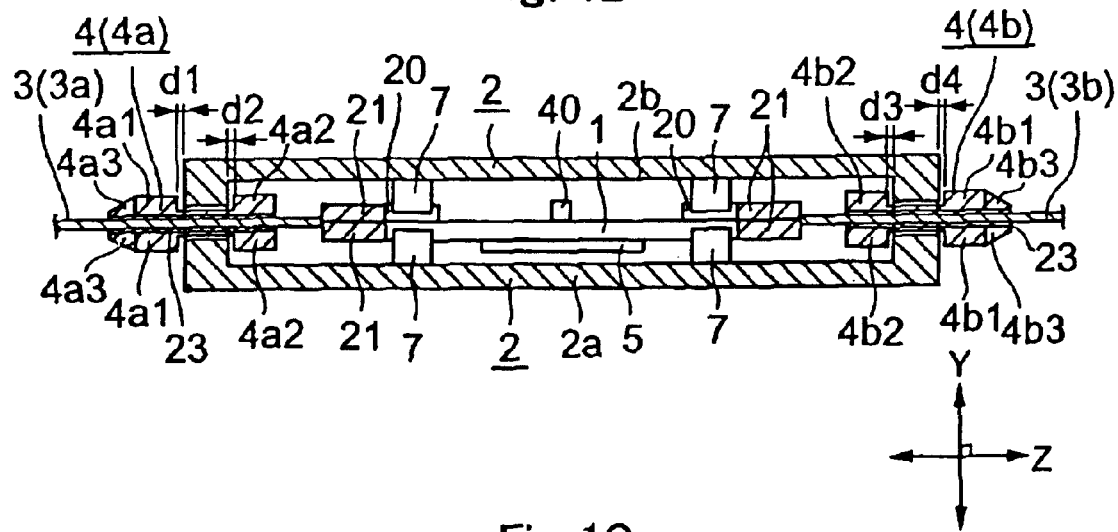
FIG. 1B is a cross-section of a line A—A shown in FIG. 1A.
Figure 1C:
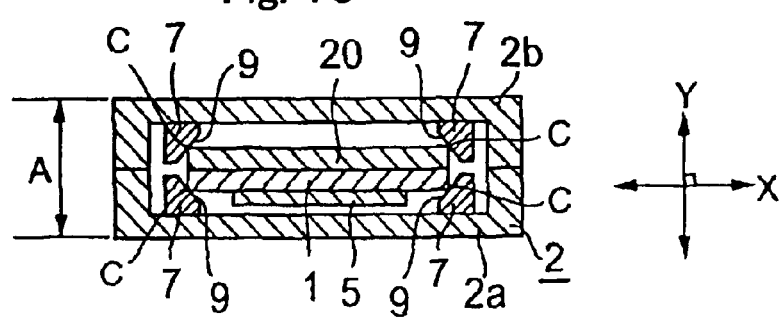
FIG. 1C is a cross-section of a line B—B shown in FIG. 1A.

FIGS. 1A to 1C show the configuration of the main part of a first embodiment of the optical fiber module in the invention. FIG. 1A is a diagram where the inside of an optical fiber module of the first embodiment is seen from above. FIG. 1B is a cross-section of a line A—A shown in FIG. 1A. FIG. 1C is a cross-section of a line B—B shown in FIG. 1A.

As shown in the drawings, the optical fiber module of the first embodiment has a package 2 and an optical component 1 housed inside the package 2 as the optical component 1 is not fixed thereto. The optical component 1 is the optical waveguide circuit where the circuit of the arrayed waveguide grating is formed over the substrate 11 as shown in FIG. 11.

The package 2 has a package main body 2a and a cover part 2b, and the size of the package 2 is 127 mm×58 mm×12 mm. At least a part of the package 2 (here, all of the package 2) is formed of a low water absorbing plastic having a water absorption of 0.024%. or below. The main component of the low water absorbing plastic is polyphenylene sulfide resin. The water absorption of polyphenylene sulfide resin adapted to the first embodiment is 0.01%.

Furthermore, the water absorption value is the value that is measured in accordance with ASTMD570 as the test specification. Generally, the water absorption of polyphenylene sulfide resin is 0.005 to 0.024%.

The thermal conductivity of polyphenylene sulfide resin adapted to the package 2 in the first embodiment is 0.27 W/(m·K), which is the thermal conductivity of 0.66 W/(m·K) or below. The thermal conductivity value is the vale that was measured in accordance with ASTMC177 as the test specification. Generally, the thermal conductivity of polyphenylene sulfide resin is 0.27 to 0.66 W/(m·K).

Inside the package 2, optical component holding parts 7 are disposed. The optical component holding parts 7 are disposed between the optical component 1 and the package 2 to hold the optical component 1. In the first embodiment, the configuration of holding the optical component 1 by the optical component holding parts 7 has a configuration of reducing heat conduction for reducing the heat conduction between the optical component 1 and the package 2. The configuration of reducing heat conduction is the configuration that the optical component holding parts 7 hold the optical component 1 in line contact.

More specifically, as shown in FIG. 1C, each of the optical component holding parts 7 is formed to project from the inner wall side of the package 2 toward the edge part side of the optical component 1, and the projected tip end parts of the separate optical component holding parts 7 are in line contact to the edge parts of the optical component 1 at C parts shown in FIG. 1C in the lines orthogonal to the paper surface. The optical component holding parts 7 are formed of members of polyphenylene sulfide resin having a thermal conductivity of 0.9 W/(m·K) or below.

The optical component 1 is held by the optical component holding parts 7 as supported from upper and lower sides. The space between the front surface of the optical component 1, that is, the upper surface of the optical component 1 and the cover part 2b of the package 2 is two millimeters in FIGS. 1B and 1C. In addition, the space between the surface of the optical component 1 on the substrate side, that is, the lower surface of the optical component 1 and the package main body 2a is two millimeters in FIGS. 1B and 1C.

Figure 2A:
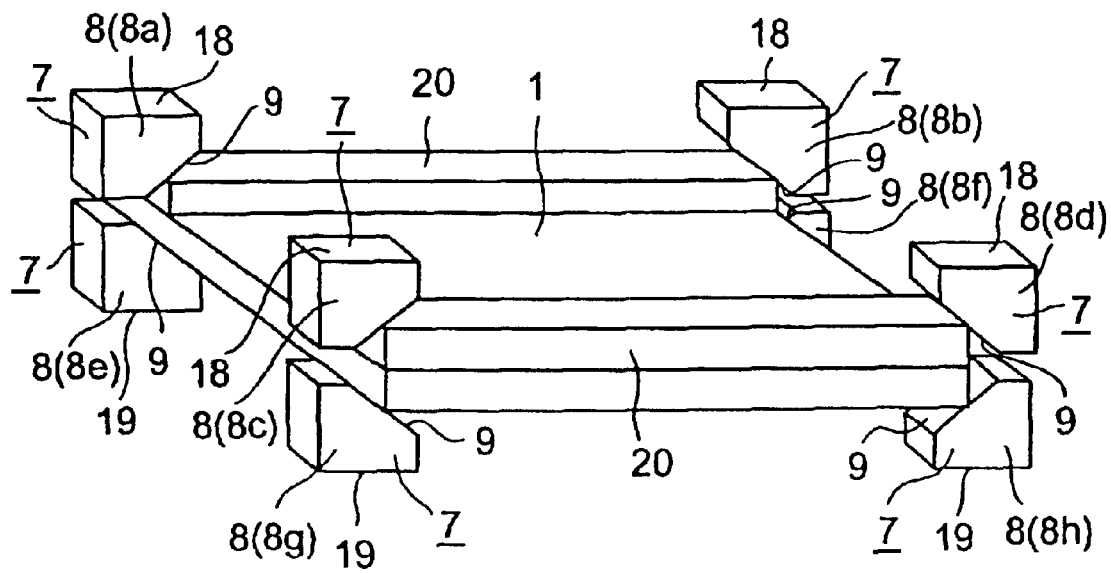
FIG. 2A is an explanatory view illustrating the form of holding an optical component by optical component holding parts in the optical fiber module of the first embodiment by a perspective view.
Figure 2B:
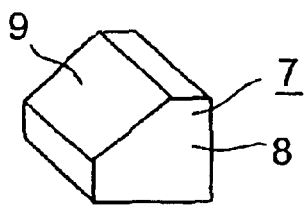
FIG. 2B is a perspective view illustrating a single optical component holding part adapted to the optical fiber module of the first embodiment.

FIG. 2A is a diagram illustrating the form of holding the optical component 1 by the optical component holding parts 7 by a perspective-view. As shown in the drawing, the separate optical component holding parts 7 are formed of block-shaped holding members 8 (8a to 8h) having a slope 9. In addition, FIG. 2B shows the perspective view of a single holding member 8. As described above, the holding members 8 are heptahedral block members.

Top faces 18 of the holding members 8 (8a to 8d) shown in FIG. 2A are bonded and fixed to the inner wall of the cover part 2b of the package 2 (not shown in FIG. 2A). Bottom faces 19 of the holding members 8 (8e to 8h) are bonded and fixed to the inner wall of the package main body 2a of the package 2.

Figure 2C:
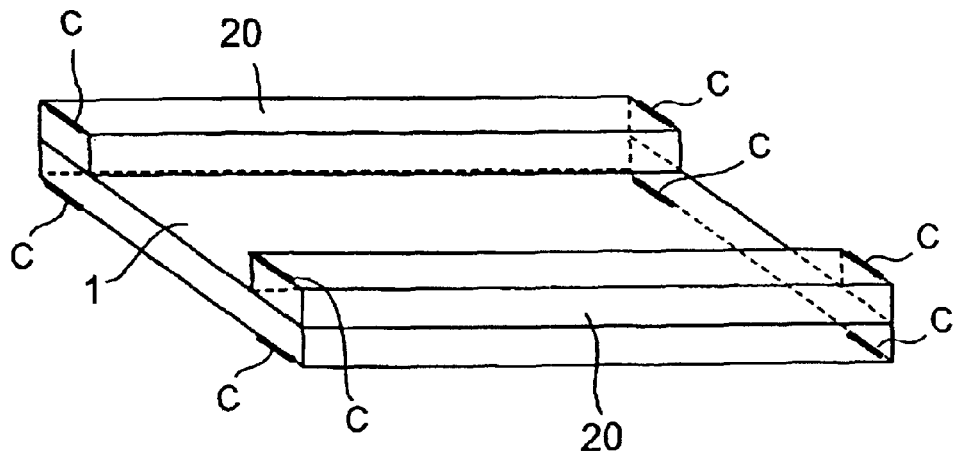
FIG. 2C is an explanatory view illustrating the contact positions of the optical component holding parts to the optical component in the optical fiber module of the first embodiment.

The separate holding members 8 (8a to 8h) are formed to project from the inner wall side of the package 2 toward the edge part side of the optical component 1, and the slopes 9 formed on the surfaces opposite to the top face 18 and the bottom face 19 are in line contact to the edge parts of the optical component 1 including lids 20. The area of line contact is areas C indicated by thick lines shown in FIG. 2C, and the contact length is five millimeters.

As shown in FIGS. 1A, 1B and 1C, a temperature control device 5 for controlling the temperatures of the optical component 1 is disposed on the surface of the optical component 1 on the substrate side. The temperature control device 5 is directly joined to the optical component 1. Moreover, a temperature sensing element 40 is bonded and fixed to the front surface of the optical component 1.

The temperature control device 5 and the temperature sensing element 40 are disposed, whereby the optical fiber module of the first embodiment can keep the optical component 1 at constant temperature such as at 70 to 80° C.

The configuration of disposing the temperature control device 5 in this manner can control the temperatures of the optical component 1 at relatively small electric power consumption. Therefore, the optical fiber module having the configuration can maintain its characteristics even though it is the optical component such that the characteristics of the optical component 1 are varied depending on temperatures.

The temperature control device 5 is formed of a silicon rubber heater. The electrical resistance value is three ohms and the size is 30 mm×20 mm×2 mm. The temperature sensing element 40 is a resistance temperature device. The electrical resistance value of the temperature sensing element 40 is 100 ohms at a temperature of 0° C., and the size is 1.6 mm×3.2 mm×1.0 mm.

To the optical component 1, one end side of at least one fiber of optical fibers 3 (3a and 3b) is connected (two fibers here). The other end sides of the optical fibers 3 (3a and 3b) are drawn out of the package 2.

A first optical fiber 3a is connected to one end side of the optical component 1, and a second optical fiber 3b is connected to the other end side of the optical component 1. The first optical fiber 3a is drawn out of one end side of the package 2, and the second optical fiber 3b is drawn out of the other end side of the package 2. The first and second optical fibers 3 (3a and 3b) are optical fiber ribbons where eight coated optical fibers are arranged side by side.

In the areas to draw the optical fibers in the package 2, optical fiber retaining members 4 (4a and 4b) are disposed in the state not to be pulled out of the package 2. Each of the optical fiber retaining members 4 (4a and 4b) has the shape shown in FIG. 3. The optical fiber retaining members 4 (4a and 4b) and the package 2 are disposed with a slight space therebetween in the X- and Y-directions.

The optical fibers 3 (3a and 3b) are inserted into the optical fiber retaining members 4 (4a and 4b) and fixed with an adhesive 23. As shown in FIG. 1B, the adhesive 23 is applied nearly throughout the areas of the optical fiber retaining members 4 (4a and 4b) in the longitudinal direction. Moreover, it is fine to apply the adhesive 23 in a part of the optical fiber retaining members 4 (4a and 4b) in the longitudinal direction. The first optical fiber 3a is fixed to a first optical fiber retaining member 4a, and the second optical fiber 3b is fixed to a second optical fiber retaining member 4b.

The first optical fiber retaining member 4 (4a) has a first collar part 4a1 and a second collar parts 4a2, and the second optical fiber retaining-member 4 (4b) has a first collar part 4b1 and a second collar part 4b2 at the positions in the longitudinal direction of the optical fibers (in the Z-direction in the drawing), the first and second collar parts extend in the direction crossing the longitudinal direction of the optical fibers. The first collar parts 4a1 and 4b1 and the second collar parts 4a2 and 4b2 sandwich the walls in the optical fiber drawing areas of the package 2 from both sides with space.

In the first embodiment, the configuration allows the relative movement of the optical fiber retaining members 4 (4a and 4b) and the package 2 in the longitudinal direction of the optical fibers. In addition, as described above, the optical fiber retaining members 4 (4a and 4b) are disposed in the package 2 in the state not to be pulled out.

The first optical fiber retaining member 4 (4a) and the second optical fiber retaining member 4 (4b) are disposed with optical fiber drawing parts 4a3 and 4b3, respectively, adjacent to the first collar parts 4a1 and 4b1. The optical fiber drawing part 4a3 is fixed to the first collar part 4a1 with the adhesive, and the optical fiber drawing part 4b3 is fixed to the first collar part 4b1 with the adhesive.

The optical fiber drawing parts 4a3 and 4b3 are formed of Viton(fluride-based rubber). The first and second optical fiber retaining members 4 (4a and 4b) are formed of polyphenylene sulfide resin except the optical fiber drawing parts 4a3 and 4b3.

The first collar parts 4a1 and 4b1 are disposed outside the package 2, and the second collar parts 4a2 and 4b2 are disposed inside the package 2. The space between the first collar part 4a1 of the first optical fiber retaining member 4a and the package 2 is d1, and the space between the second collar part 4a2 of the first optical fiber retaining member 4a and the package 2 is d2. The space between the second collar part 4b2 of the second optical fiber retaining member 4b and the package 2 is d3, and the space between the first collar part 4b1 of the second optical fiber retaining member 4b and the package 2 is d4.

The values of the spaces d1, d2, d3 and d4 are variables, and the relationship between the spaces is d1>d3 and d4>d2. In fabricating the optical fiber module, the values of d1 and d2 are 0.5 mm, the value of d3 is zero, and the value of d4 is 1.0 mm. The movable distance of the first and second optical fiber retaining members 4a and 4b is 0.5 mm.

In the first embodiment, the spaces between the optical fiber retaining members 4 (4a and 4b) and the package 2 are thus formed, whereby the distance of relative movement between the optical fiber retaining members 4 (4a and 4b) and the package 2 is determined. The distance of relative movement is the range that allows suppressing a tensile stress to be applied to the optical component 1 and the connecting parts of the optical component 1 to the optical fibers 3 (3a and 3b) when the tensile stress is applied to the optical fibers 3 (3a and 3b).

In the first embodiment, the spaces between the optical fiber retaining members 4 (4a and 4b) and the package 2 are thus formed, whereby the first embodiment has the following configuration. More specifically, the distance of the relative movement between the optical fiber retaining members 4 (4a and 4b) and the package 2 is formed greater than the relative displacement of the package 2 and the optical fiber retaining members 4 (4a and 4b) due to expansion and contraction of the package 2 caused by heat associated with temperature changes in the range of temperature for use.

The configuration in the drawing parts of the optical fibers 3 (3a and 3b) from the package 2 is described in a Japanese Patent Application (Application No. JP 2001-306524), which was proposed by the applicant before. More specifically, the proposal submits the configuration in which the optical fiber retaining members 4 (4a and 4b) are disposed and the spaces between the optical fiber retaining members 4 (4a and 4b) and the package 2 are formed as described above.

The effects and advantages by the configuration of arranging the optical fiber retaining members 4 (4a and 4b) are as described in the proposal in details. In this specification, the configuration, effects and advantages are incorporated in the description of the specification.

In the meantime, in determining the configuration, the inventor varied the materials of the optical component holding parts 7, changed the thermal conductivity of the optical component holding parts 7 variously, and measured the relationship between the thermal conductivity of the optical component holding parts 7 and the electric power consumption of the temperature control device 5.

Figure 4:
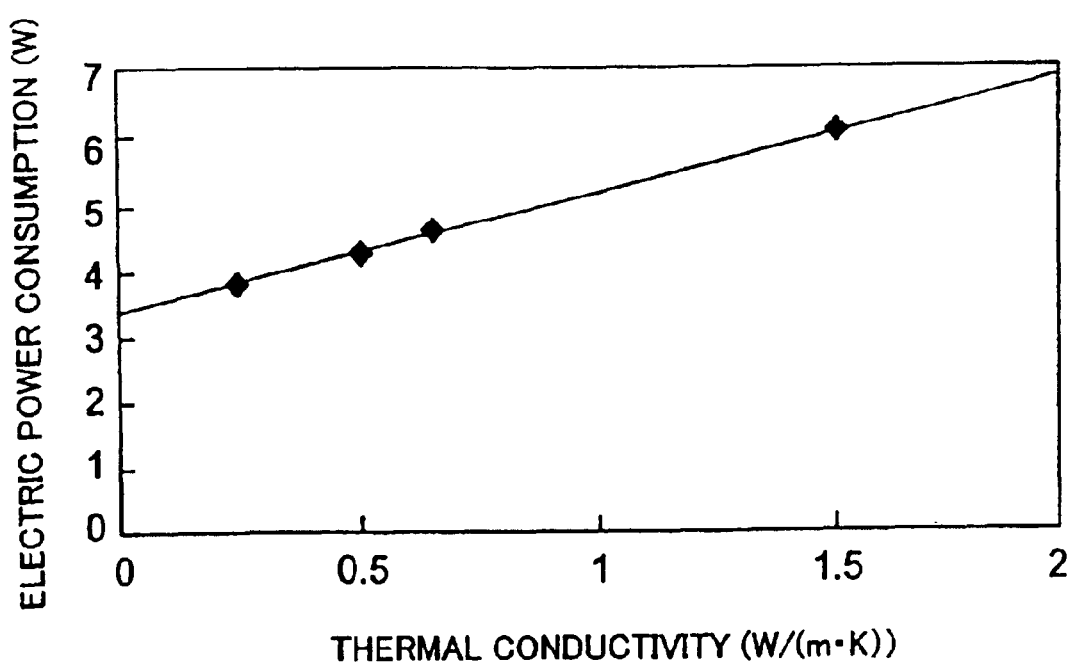
FIG. 4 is a graph illustrating the relationship between the thermal conductivity of the optical component holding parts and the electric power consumption of a temperature control device.

Consequently, as shown in FIG. 4, it was revealed that the material of the optical component holding parts 7 needs to be determined as below in order to decrease the thickness of the package 2 to 12 mm (A shown in FIG. 1C) to reduce the electric power consumption of the temperature control device 5 to five watts or below.

More specifically, it was revealed that the optical component holding parts 7 need to be formed of a material having a thermal conductivity of 0.9 W/(m·K) or below. Then, in the first embodiment, the material of the optical component holding parts 7 was formed of polyphenylene sulfide resin having a thermal conductivity of 0.9 W/(m K) or below.

In this manner, according to the configuration in which the optical component holding parts 7 are formed of the material having a thermal conductivity of 0.9 W/(m·K) or below, the heat conduction from the optical component 1 to the package side can be further decreased, the temperature control of the optical component can be conducted more efficiently, and the electric power consumption for temperature control can be reduced.

In addition, the range of temperature for use in the optical fiber module of the first embodiment is 0 to 70° C., and the preset temperature of optical component 1 controlled by the temperature control device 5 is 70 to 80° C.

The first embodiment is thus configured, and the configuration of holding the optical component 1 by the optical component holding parts 7 has the configuration of reducing heat conduction, which reduces the heat conduction between the optical component 1 and the package 2 in the first embodiment. More specifically, the optical component 1 is held by the optical component holding parts 7 disposed inside the package 2 in line contact.

On this account, the first embodiment can reduce the ratio of conducting the heat in the optical component 1 heated by the temperature control device 5 from the optical component 1 to the package 2 side. Accordingly, the first embodiment can heat and keep the optical component 1 efficiently, and it can reduce the electric power consumption of the temperature control device 5.

According to the first embodiment, the optical component holding parts 7 are in line contact to the edge parts at four corners of the optical component 1. Thus, the contact parts of the optical component holding parts 7 to the optical component 1 can be kept apart from the center of the heated part by the temperature control device 5, and the power consumption can be lowered further.

In the first embodiment, the optical component holding parts 7 are formed of the holding members 8 (8a to 8h) made of polyphenylene sulfide resin. The thermal conductivity of polyphenylene sulfide resin has a small value of 0.9 W/(m·K) or below.

Therefore, the first embodiment can efficiently heat and keep the optical component 1, and it can reduce the electric power consumption of the temperature control device 5 to five watts or below as shown in FIG. 4. In this manner, the optical fiber module having the electric power consumption of the temperature control device reduced to five watts or below can realize reduced electric power consumption, which is demanded by the optical communication system side.

In fact, the inventor placed the optical fiber module of the first embodiment under an atmosphere at an ambient temperature of 0° C., set the preset temperature of the temperature control device 5 to a temperature of 80° C., and measured the electric power consumption, which was 3.82 W. The range of temperature for use in the optical fiber module of the first embodiment is 0 to 70° C., and the preset temperature of the optical component 1 controlled by the temperature control device 5 is 70 to 80° C.

As described above, the optical fiber module of the first embodiment can satisfy the requirement by the system side. More specifically, the optical fiber module of the first embodiment can decrease the package thickness (A shown in FIG. 1C) to 12 mm, and can attain an electric power consumption of five watts or below.

In proposing the first embodiment, the inventor considered a reason as follows, the reason why the package 2 was deteriorated because of cracks when the optical fiber module was placed under a high temperature, high humidity atmosphere in the traditional optical fiber module. More specifically, as shown in Table 4, it was considered that why the package 2 had been deteriorated was that the material of forming the package 2 had a high water absorption and the package 2 absorbed much water under a high temperature, high humidity environment.

Therefore, the materials of forming the package 2 were considered variously in order to propose an optical fiber module excellent in the characteristics of environmental resistance, which would not have cracks in the package 2 even under the severe high temperature, high humidity environment. Then, the package 2 was to be formed of polyphenylene sulfide resin having a small water absorption.

As described above, in the first embodiment, the package 2 was formed of 0.01%. polyphenylene sulfide resin having a water absorption of 0.024% or below. On this account, an optical fiber module highly reliable for a long time can be formed in which cracks are not generated due to water absorption even under the high temperature, high humidity environment.

The optical fiber module of the first embodiment did not have cracks when it was actually allowed to stand in a severe environment at a temperature of 85° C. at a humidity of 85% after 2000 hours and 5000 hours (damp heat test). Moreover, the optical characteristics of the optical component 1 inside the package 2 were determined after the damp heat test, and it was observed that the characteristics were significantly stable.

In the first embodiment, the thermal conductivity of polyphenylene sulfide resin forming the package 2 is 0.27 W/(m·K), having a significantly small thermal conductivity. On this account, the first embodiment can reduce the ratio of conducting the heat in the optical component 1 heated by the temperature control device 5 from the optical component 1 to the package 2 side. Accordingly, the first embodiment can heat and keep the optical component 1 efficiently, and it can reduce the electric power consumption of the temperature control device 5.

In the first embodiment, the optical fiber retaining members 4 (4a and 4b) are disposed at the drawing parts of the optical fibers 3 (3a and 3b) from the package 2, and the spaces between the optical fiber retaining members 4 (4a and 4b) and the package 2 are set d1>d3 and d4>d2, whereby the following advantage can be exerted.

More specifically, when a tensile stress is applied to the second optical fiber 3 (3b) toward the right side of FIGS. 1A and 1B, the optical fibers 3 (3a and 3b) and the optical component 1 are relatively moved in the right side of FIGS. 1A and 1B with respect to the package 2. However, when the second collar part 4b2 of the second optical fiber retaining member 4 (4b) is hooked into the package 2, the optical component 1 cannot be moved more.

At this time, the space d1 between the first collar part 4a1 of the first optical fiber retaining member 4 (4a) and the package 2 is above zero. Thus, the stress will not applied to the optical component 1 and the connecting parts of the optical component 1 to the optical fibers 3 (3a and 3b). Accordingly, in the optical fiber module of the first embodiment, the optical characteristics such as the insertion loss of the optical component 1 are not varied.

When a tensile stress is applied to the first optical fiber 3 (3a) toward the left side of FIG. 1A and FIG. 1B, the optical fibers 3 (3a and 3b) and the optical component 1 are relatively moved in the left side of FIG. 1A and FIG. 1B with respect to the package 2 in accordance with the tensile stress. However, when the second collar part 4a2 of the first optical fiber retaining member 4 (4a) is hooked into the package 2, the optical component 1 cannot be moved more.

At this time, the space d4 between the first collar part 4b1 of the second optical fiber retaining member 4 (4b) and the package 2 is above zero. Thus, the stress will not be applied to the optical component 1 and the connecting parts of the optical component 1 to the optical fibers 3 (3a and 3b). Accordingly, in the optical fiber module of the first embodiment, the optical characteristics such as the insertion loss of the optical component 1 are not varied.

Therefore, the first embodiment can suppress the tensile stress having been applied to the optical fibers 3 (3a and 3b) to be applied to the optical component 1 and the connecting parts of the optical component 1 to the optical fibers 3 (3a and 3b) inside the package 2, and the first embodiment can suppress the optical characteristics of the optical component 1 to be varied.

In fact, the following tensile test was conducted to the optical fiber module of the first embodiment, and the results shown in Table 5 were obtained. The tensile test was the test that the optical fibers 3 (3a and 3b) were held at the portions 100 mm apart from the optical fiber drawing ports of the package 2 in the optical fiber module and they were pulled by a load of 15 N for 60 seconds.

TABLE 5

| Sample No. | Variation of insertion loss during applying a stress (dB) |
| --- | --- |
| 1 | 0.000 |
| 2 | 0.000 |
| 3 | 0.000 |
| 4 | 0.000 |
| 5 | 0.000 |

Table 5 shows the variation (increase) of the insertion loss during applying the stress. As apparent from the table, according to the configuration, no tensile stress is applied to the optical component 1 and the connecting parts of the optical component 1 to the optical fibers 3 (3a and 3b), and the first embodiment does not have the variation of the insertion loss of the optical component 1. More specifically, the configuration in which the optical fiber retaining members 4 (4a and 4b) are disposed at the drawing ports of the optical fibers 3 (3a and 3b) from the package 2 can suppress the variation of the insertion loss of the optical component 1.

In the optical fiber module of the first embodiment, when the package 2 is expanded and contracted by heat associated with temperature changes in the range of temperature for use, the package 2 and the optical fiber retaining members 4 (4a and 4b) are relatively moved. On this account, the stress will not be applied from the package 2 to the optical component 1 and the connecting parts of the optical component 1 to the optical fibers 3 (3a and 3b) inside the package 2 associated with expansion and contraction of the package 2 caused by heat.

According to the first embodiment, the optical fiber drawing parts (4a3 and 4b3) of the optical fiber retaining members 4 (4a and 4b) are formed of Viton(fluride-based rubber). Thus, even though lateral bending is applied to the optical fibers 3 (3a and 3b), an increase in the insertion loss caused by the lateral bending can be suppressed.

In the first embodiment, it was not observed that the optical characteristics were deteriorated after the impact test and the vibration test.

According to the first embodiment, the optical component 1 has the optical waveguide circuit where the circuit of optical waveguides is formed over the substrate 11. Here, the optical waveguide circuit is the circuit of the arrayed waveguide grating. In this manner, in the optical fiber module having the optical waveguide circuit, various circuit configurations to be formed in the optical waveguide circuit are properly set, whereby the optical fiber module having various functions of beam splitting, and wavelength multiplexing and demultiplexing can be fabricated accurately.

Figure 5A:
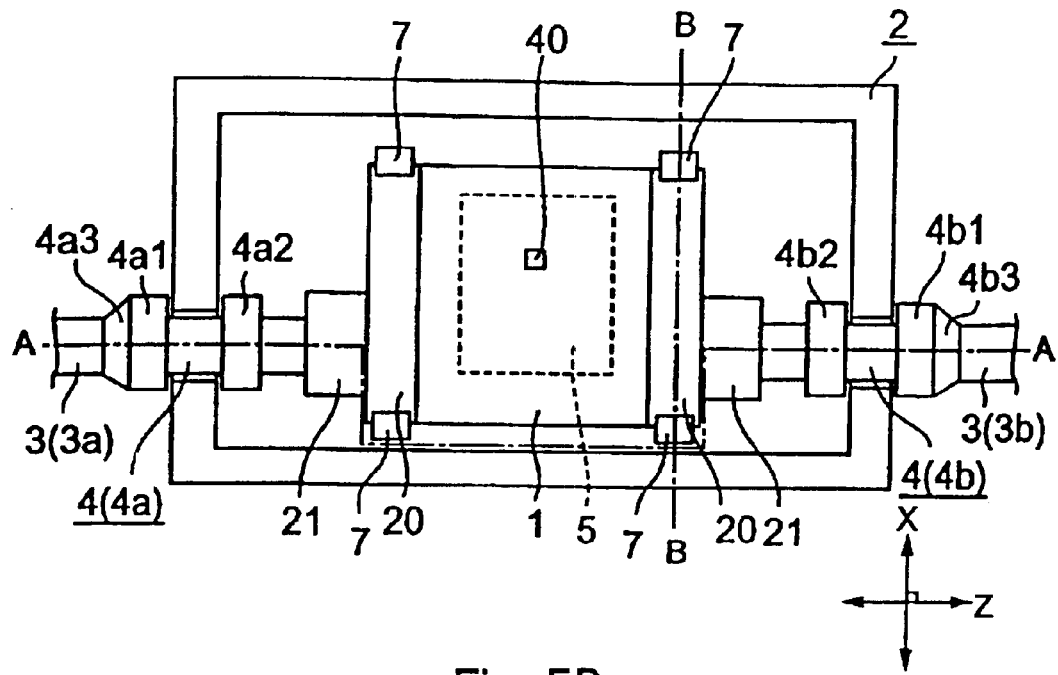
FIG. 5A is a plan view illustrating the configuration of the main part of a second embodiment of the optical fiber module in the invention by the drawing where the inside is seen from above.
Figure 5B:
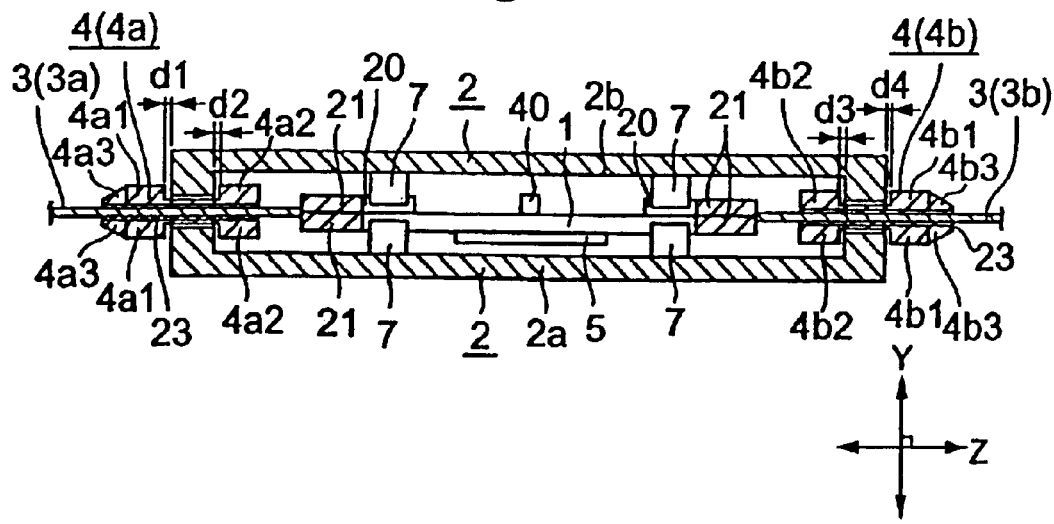
FIG. 5B is a cross-section of a line A—A shown in FIG. 5A.
Figure 5C:
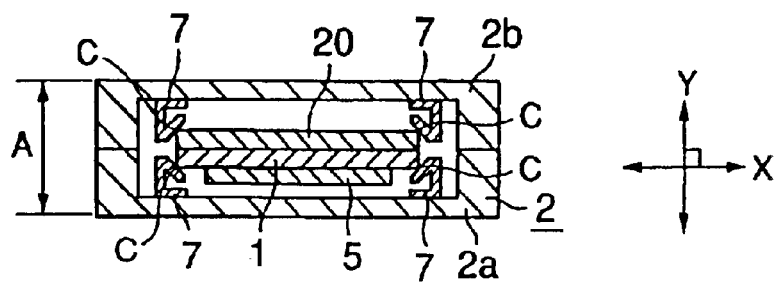
FIG. 5C is a cross-section of a line B—B shown in FIG. 5A.

FIGS. 5A to 5C illustrate the configuration of the main part of a second embodiment of the optical fiber module in the invention. FIG. 5A is a diagram of the optical fiber module of the second embodiment where the inside is seen from above. FIG. 5B is a cross-section of a line A—A shown in FIG. 5A. FIG. 5C is a cross-section of a line B—B shown in FIG. 5A.

The optical fiber module of the second embodiment is fabricated as almost similar to the first embodiment. In the description of the second embodiment, the portions having the same designations as the first embodiment are designated the same numerals and signs, omitting or simplifying the overlapping description.

Figure 6A:
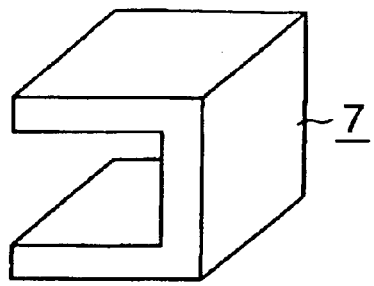
FIG. 6A is a perspective view illustrating the state of a single optical component holding part adapted to the optical fiber module of the second embodiment before elastically deformed.
Figure 6B:
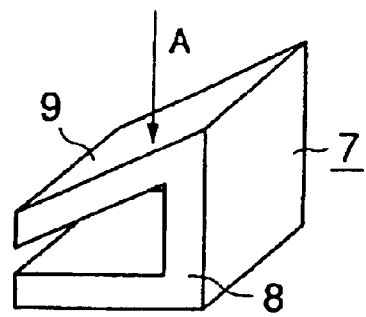
FIG. 6B is a perspective view illustrating the state of the optical component holding part shown in FIG. 6A after elastically deformed.

The distinctive configuration of the second embodiment different from the first embodiment is in that optical component holding parts 7 are formed of holding member 8 of elastic members that have a U-shape in the cross-section as shown in FIG. 6A and are elastically deformed when a force is applied in the direction of an arrow A shown in FIG. 6B.

According to the configuration, in the second embodiment, the optical component holding parts 7 are substantially in line contact at C-parts along the edge parts of the optical component 1 with the lines orthogonal to the paper surface as shown in FIG. 5C. More specifically, in the second embodiment, the configuration in which the optical component holding parts 7 hold an optical component 1 substantially in line contact forms the configuration of reducing heat conduction. In addition, the holding members 8 forming the optical component holding parts 7 are made of Viton being a rubber elastic member, which form the configuration of releasing an impact applied to the optical component 1.

Figure 6C:
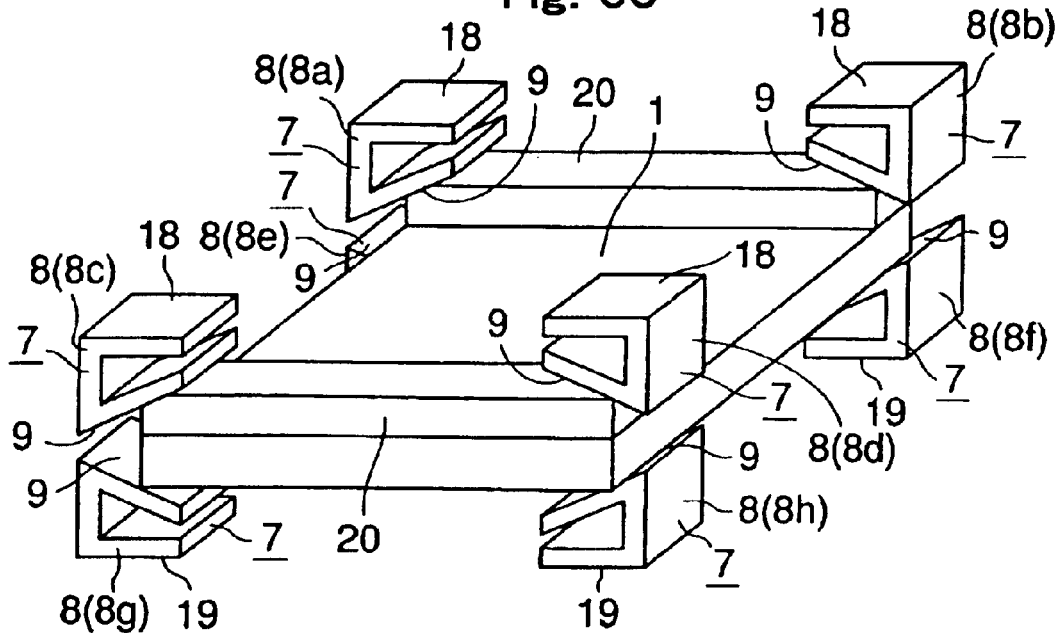
FIG. 6C is an explanatory view illustrating the form of holding the optical component by the optical component holding parts in the optical fiber module of the second embodiment by a perspective view.

FIG. 6C is a diagram illustrating the form of holding the optical component 1 by the optical component holding parts 7 by a perspective view. As shown in the drawing, the holding members 8 (8a to 8h) forming the optical component holding parts 7 support the optical component 1 as sandwiching it from above and below in the form shown in FIG. 6B.

Top faces 18 of the holding members 8 (8a to 8d) shown in FIG. 6C are bonded and fixed to the inner wall of a cover part 2b of a package 2 (not shown in FIG. 6C). Bottom faces 19 of the holding members 8 (8e to 8h) are bonded and fixed to the inner wall of a package main body 2a of the package 2.

Figure 6D:
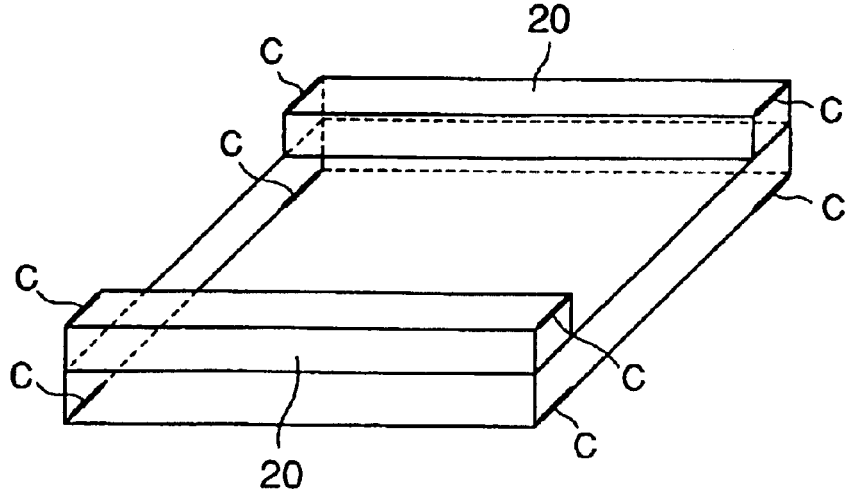
FIG. 6D is an explanatory view illustrating the contact positions of the optical component holding parts to the optical component in the optical fiber module of the second embodiment.

Then, the surfaces opposite to the top faces 18a and the bottom faces 19 of the holding members 8 (8a to 8h) are formed into slopes 9, which are substantially in line contact along the edge parts of the optical component 1 including lids 20. The areas of substantial line contact are areas C indicated by thick lines shown in FIG. 6D, and the contact length is five millimeters.

The optical fiber module of the second embodiment is thus formed. The second embodiment also can exert almost the same advantages of the first embodiment.

More specifically, in the optical fiber module of the second embodiment, the optical component 1 is held by the optical component holding parts 7 disposed inside the package 2 substantially in line contact as described above. On this account, the second embodiment can reduce the ratio of conducting the heat in the optical component 1 heated by a temperature control device 5 from the optical component 1 to the package 2 side. Accordingly, the optical component 1 can be heated and kept efficiently, and the electric power consumption of the temperature control device 5 can be reduced.

In the optical fiber module of the second embodiment, the optical component holding parts 7 are substantially in line contact to the edge parts at four corners of the optical component 1. Therefore, the second embodiment can keep the contact parts of the optical component holding parts 7 to the optical component 1 apart from the center of the heated part by the temperature control device 5, and the electric power consumption can be further lowered.

In fact, the inventor placed the optical fiber module of the second embodiment under an atmosphere at an ambient temperature of 0° C., set the preset temperature of the temperature control device 5 to be 80° C., and measured the electric power consumption. Consequently, the electric power consumption of the temperature control device 5 was 3.85 W. More specifically, the optical fiber module of the second embodiment could reduce the electric power consumption of the temperature control device 5 lower than the configuration shown in FIG. 14 did.

According to the second embodiment, the optical component holding parts 7 are formed of the rubber holding members 8 (8a to 8h), and thus they can relax the impact applied to the optical component 1 from the package 2 side. Therefore, the optical fiber module of the second embodiment can suppress cracks to be generated in the optical component 1 and the optical component 1 to be damaged.

Table 6 shows the results of the impact test and the vibration test on the optical fiber module of the second embodiment. The tests were continuously conducted in order of the impact test and the vibration test. The results of the impact test are the results that the variations in the insertion loss were measured after impacts of 500 G×5 times were applied in the three axial directions orthogonal to each other. The results of the vibration test are the results that the variations in the insertion loss were measured after vibrations of 10 to 55 Hz were applied in the three axial directions orthogonal to each other. Moreover, the variations in the insertion loss after the vibration test are variations before the impact test.

TABLE 6

| Sample No. | After the impact test (dB) | After the vibration test (dB) |
|---|---|---|
| 1 | 0.010 | 0.005 |
| 2 | 0.009 | 0.002 |
| 3 | 0.001 | 0.003 |
| 4 | 0.008 | 0.010 |
| 5 | 0.006 | 0.002 |
| 6 | 0.004 | 0.000 |
| 7 | 0.007 | 0.005 |
| 8 | 0.003 | 0.008 |

As apparent from Table 6, no sample fabrications were deteriorated in the insertion loss by the impact test and the vibration test. The second embodiment could realize the optical fiber module with strong mechanical strength.

Figure 7:
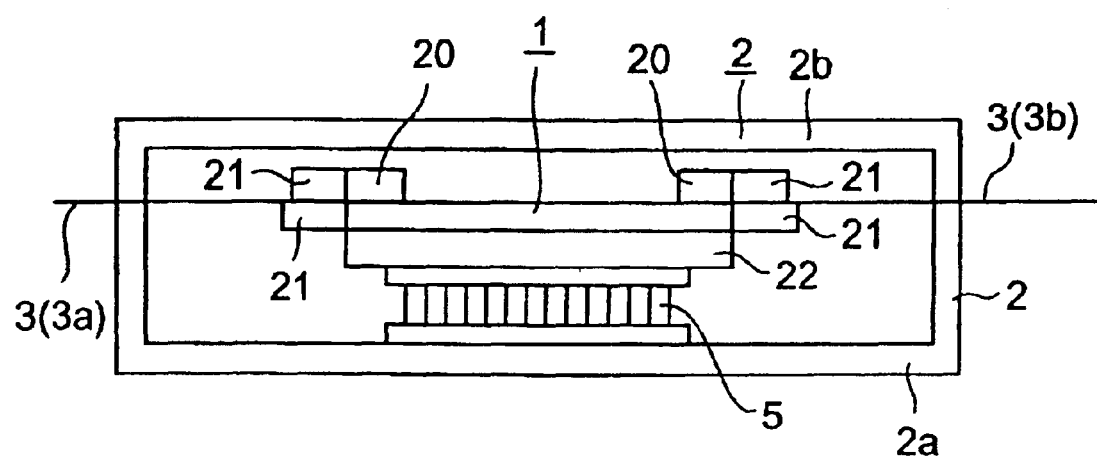
FIG. 7 is an explanatory view illustrating the configuration of the main part of a third embodiment of the optical fiber module in the invention by a cross-section.

FIG. 7 shows a third embodiment of the optical fiber module in the invention. The third embodiment is configured as almost similar to the first and second embodiments. In the description of the third embodiment, the portions having the same designations as the first and second embodiments are designated the same numerals and signs, omitting the overlapping description.

In the third embodiment, a temperature control element 5 is formed of a Peltier module, and a package main body 2a is formed of aluminum. When the range of temperature for use in the optical fiber module is set from 0 to 70° C., the Peltier module generally controls the temperatures of an optical component 1 to range from 40 to 50° C. Therefore, the Peltier module sometimes cools the optical component 1 within the range of temperature for use. In the optical fiber module of the third embodiment, a package main body 2a was formed of aluminum in consideration of the cooling efficiency in cooling.

More specifically, the front surface side of the temperature control device 5 of the Peltier module is boned to the substrate side of the optical component 1 through a heat spreading plate 22, and the back surface of the temperature control device 5 is bonded to the package main body 2a. The heat generated in the back surface side of the temperature control device 5 in cooling the optical component 1 by the temperature control device 5 is efficiently dissipated through the package main body 2a of highly thermally conductive aluminum.

A cover part 2b of a package 2 was formed of polyphenylene sulfide resin having a small thermal conductivity as similar to the embodiments in order to barely release the heat from the package 2 in heating the optical component 1 by the temperature control device 5. The optical fiber module of the third embodiment does not have optical component holding parts 7.

The third embodiment is thus configured, and the third embodiment can exert the same advantages as the first and second embodiments. In fact, the optical fiber module of the third embodiment was allowed to stand under a severe environment at a temperature of 85° C. at a humidity of 85%. However, cracks were not generated even after 2000 hours and 5000 hours, and the optical characteristics of the optical component inside the package 2 were significantly stable.

Also in the third embodiment, the cover part 2b of the package 2 was formed of polyphenylene sulfide resin having a small thermal conductivity. Thus, it can reduce the electric power consumption of the temperature control device 5 as similar to the first and second embodiments.

The invention is not limited to the embodiments, which can adopt various forms. For example, in the first and second embodiments, the optical component holding parts 7 were formed to project from the inner wall side of the package 2 toward the edge part side of the optical component 1, and the projected tip end sides of the optical component holding parts 7 were allowed in line contact to the edge parts of the optical component 1. However, the arrangement form, shape, and number of the optical component holding parts 7 are not limited particularly, which can be set properly.

Figure 8:
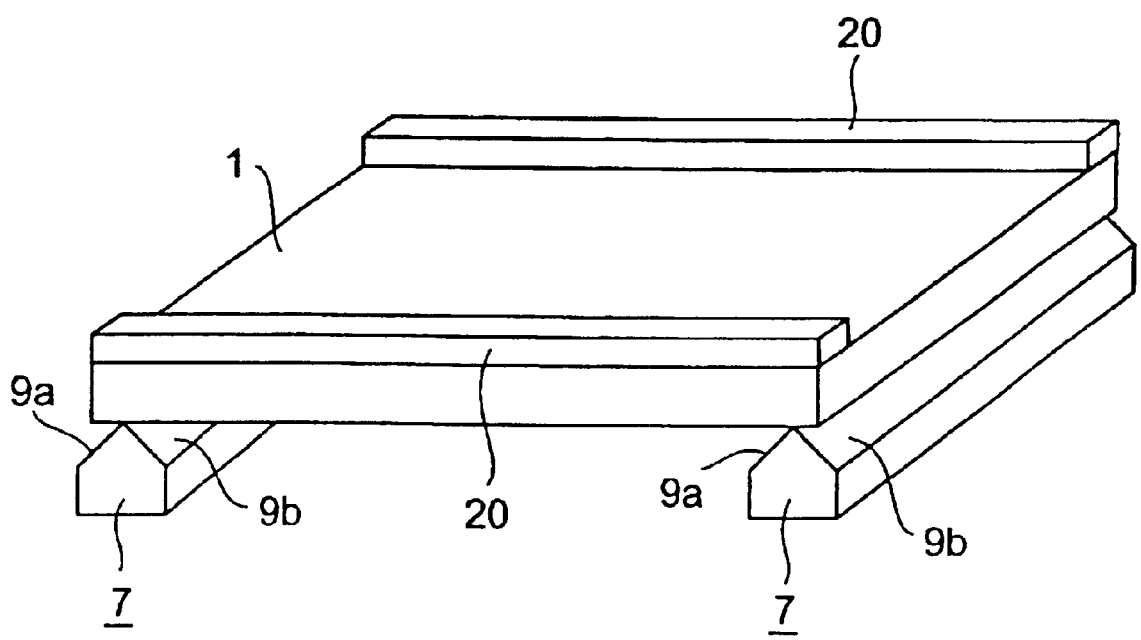
FIG. 8 is an explanatory view illustrating the form of holding an optical component by optical component holding parts in another embodiment of the optical fiber module in the invention.

For example, as shown in FIG. 8, it is acceptable that optical component holding parts 7 having adjacent slopes 9a and 9b are disposed inside the package 2 (not shown in FIG. 8) and the edge lines of the slopes 9a and 9b are allowed in line contact to the substrate surface of an optical component 1. In this manner, the form that the optical component 1 is held by the optical component holding parts 7 disposed inside the package 2 in line contact can be arranged variously.

In the second embodiment, the optical component holding parts 7 were the elastic members, and the elastic members were formed of Viton. However, it is fine to form the optical component holding parts 7 of members with rubber elasticity other than Viton. This case also exerts the same advantages as the second embodiment.

Figure 9A:
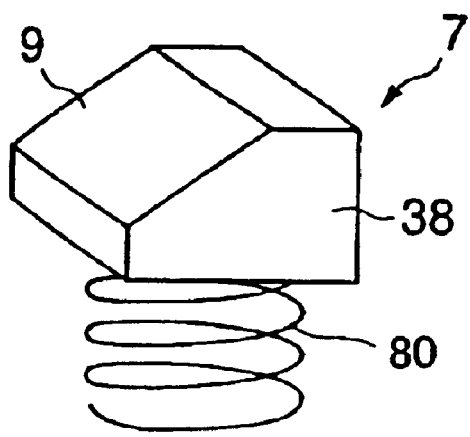
FIG. 9A is a perspective view illustrating an optical component holding part adapted to still another embodiment of the optical fiber module in the invention before elastically deformed.
Figure 9B:
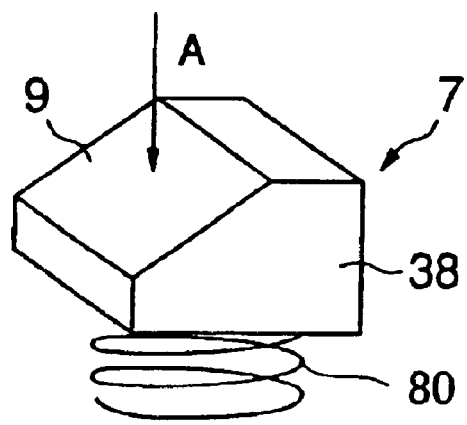
FIG. 9B is a perspective view illustrating the optical component holding part shown in FIG. 9A after elastically deformed.
Figure 10:
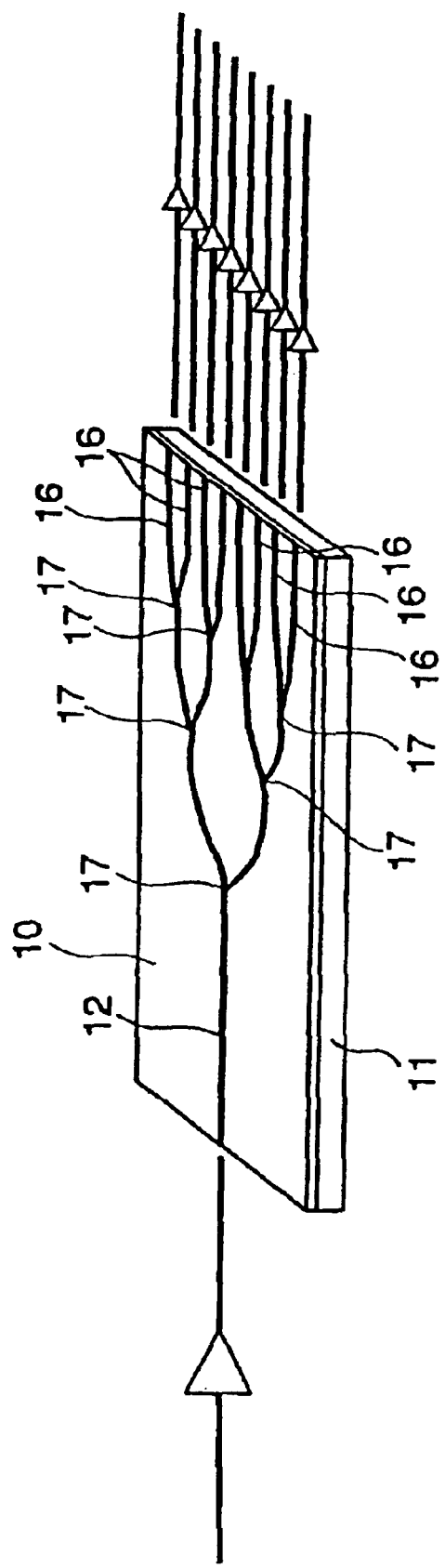
FIG. 10 is an explanatory view illustrating an example of the optical waveguide circuit having the 1×8 optical waveguide circuit.
Figure 12A:
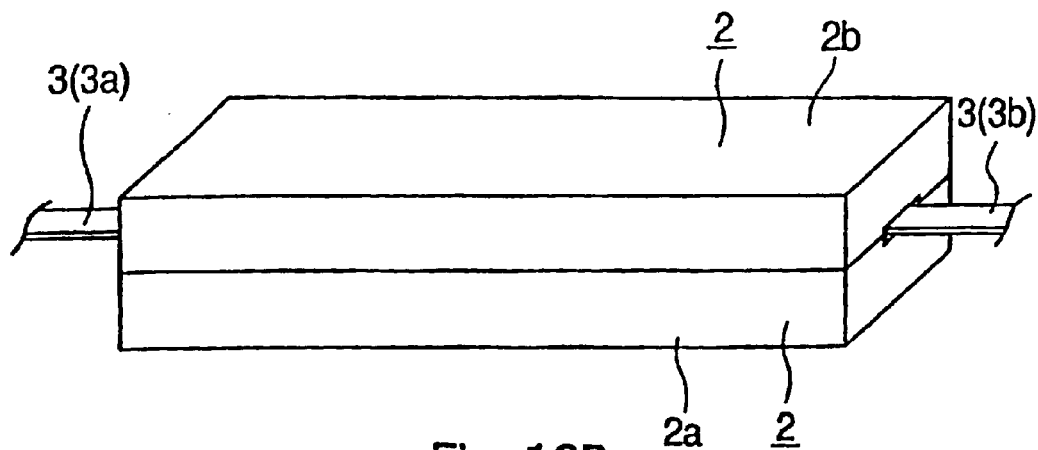
FIG. 12A is a perspective explanatory view illustrating the exemplary configuration of the traditional optical fiber module.
Figure 12B:
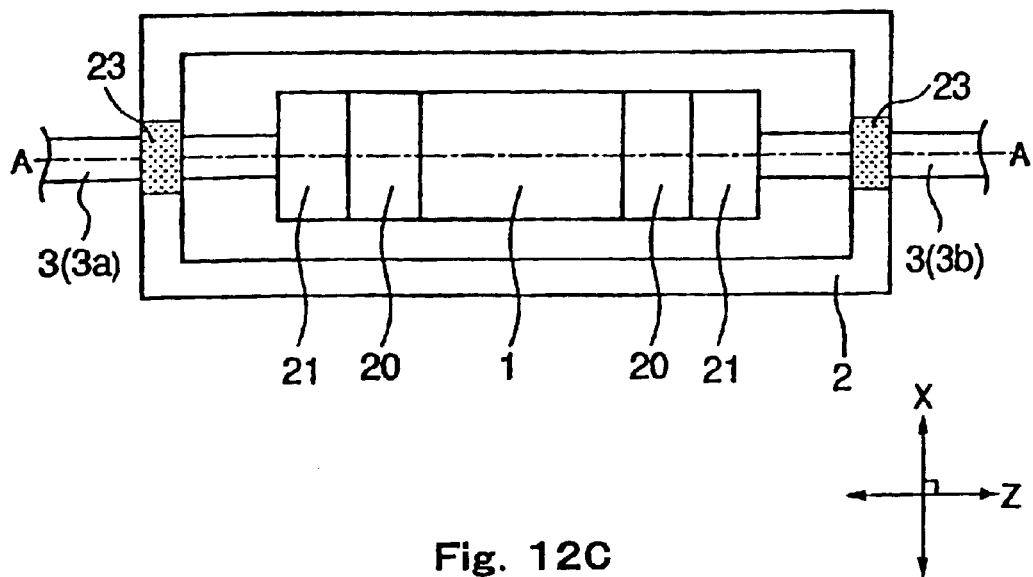
FIG. 12B is an explanatory view illustrating the optical fiber module shown in FIG. 12A by the plan view where the inside is seen.
Figure 12C:
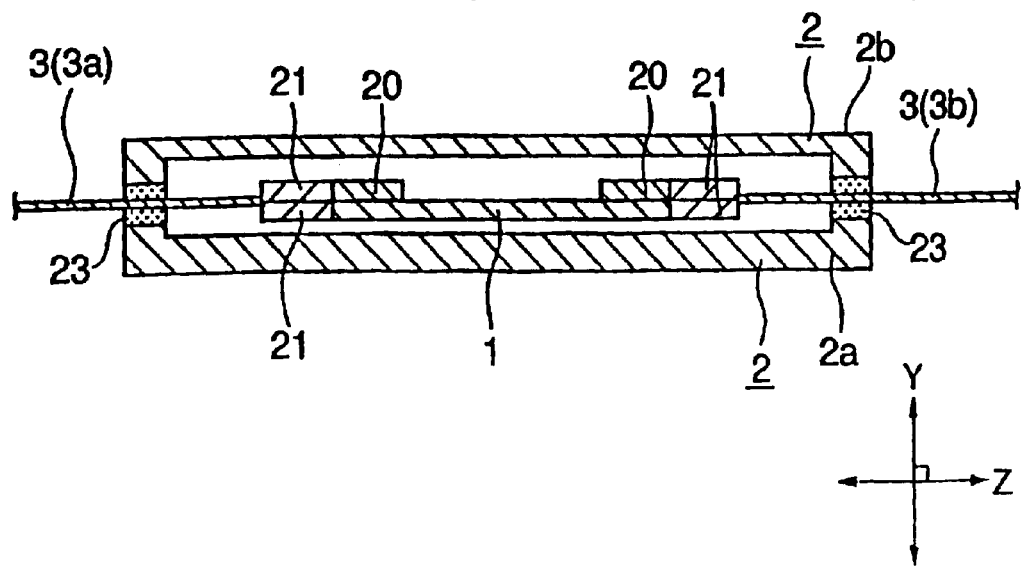
FIG. 12C is a cross-section of a line A—A shown in FIG. 12B.
Figure 13:
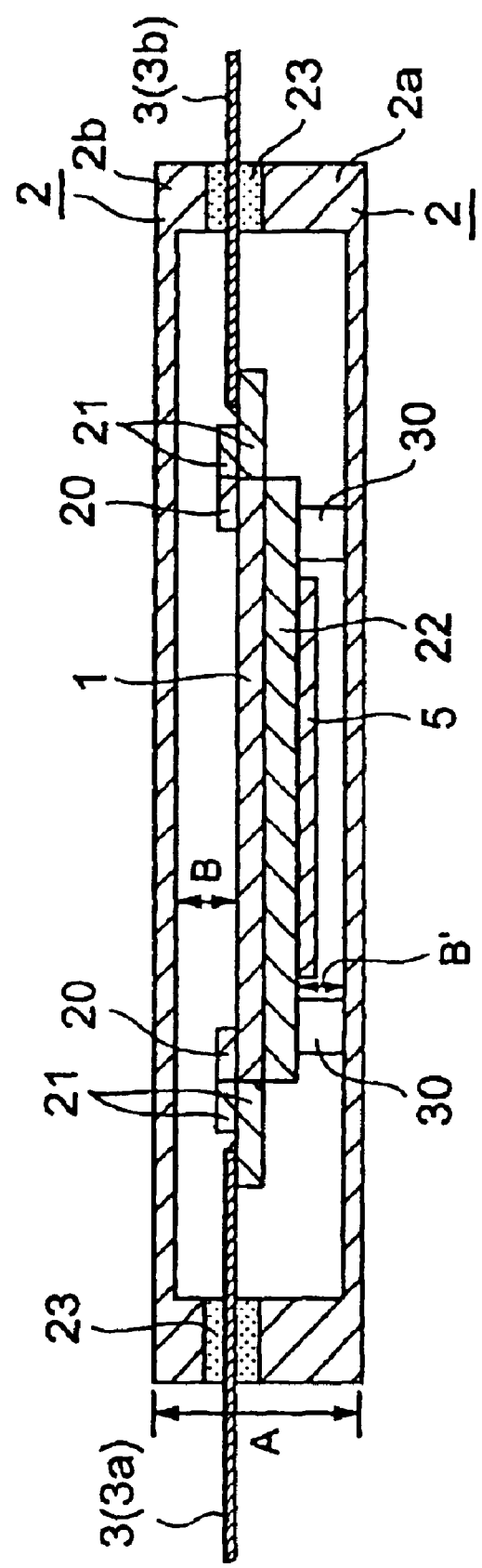
FIG. 13 is an explanatory view illustrating the exemplary configuration of the optical fiber module of the traditional proposal by a cross-section.

As shown in FIGS. 9A and 9B, it is acceptable that optical component holding parts 7 are configured to have an elastic member (spring member) 80 formed of a spring and a block member 38. In this case, the configuration is formed in which the elastic members 80 are fixed to the package 2 side and slopes 9 of the block members 38 are substantially in line contact to an optical component 1 to hold the optical component 1. Then, the spring members 80 are elastically deformed by a force in the direction of A shown in FIG. 9B, whereby an impact applied to the optical component 1 is relaxed by the spring members 80. This case can also exert the advantages as the second embodiment.

In the first and second embodiments, the optical component holding parts 7 were bonded and fixed to the inner wall of the package 2. However, the optical component holding parts 7 are not necessarily bonded and fixed to the inner wall of the package 2. For example, it is acceptable that the optical component holding parts 7 are formed in one piece with the package 2.

As described above, the arrangement form, shape, and number of the optical component holding parts 7 are not limited particularly, which can be set properly. In the optical fiber module of the configuration in which the optical component holding parts 7 are disposed to hold the optical component 1, it is fine that the configuration of holding the optical component 1 by the optical component holding parts 7 has the configuration of reducing heat conduction for reducing the heat conduction between the optical component 1 and the package 2.

Figure 3:
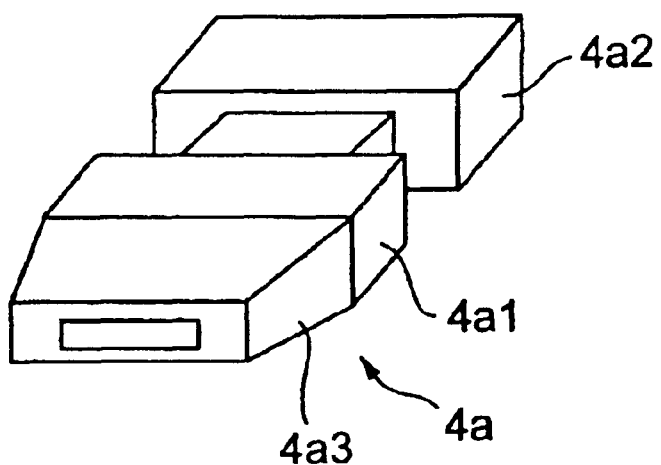
FIG. 3 is an explanatory view illustrating an optical fiber retaining member adapted to the optical fiber module of the first embodiment.

In the first and second embodiments, the optical fiber retaining members 4 (4a and 4b) were formed into the shape shown in FIG. 3. Then, the first collar parts (4a1 and 4b1) and the second collar parts (4a2 and 4b2) of the optical fiber retaining members 4 (4a and 4b) were formed of polyphenylene sulfide resin, and the optical fiber drawing parts (4a3 and 4b3) were formed of Viton(fluride-based rubber). However, the shapes and materials of forming the optical fiber retaining members 4 (4a and 4b) are not limited particularly, which can be set properly.

The optical fiber retaining members 4 (4a and 4b) are not necessarily fixed to the optical fibers 3 (3a and 3b) with the adhesive 23. Products that can fix both are acceptable.

The sizes and fabricating methods of the optical fiber retaining members 4 (4a and 4b) are not limited particularly, which can be set properly. For example, it is fine that the optical fiber retaining members 4 (4a and 4b) are formed of plastic materials and are shaped in one piece with the optical fibers 3 (3a and 3b).

In the embodiments, the optical fiber retaining members 4 (4a and 4b) were disposed at the drawing parts of the optical fibers 3 (3a and 3b) from the package 2. However, the configuration is acceptable that the optical fiber retaining members 4 (4a and 4b) are omitted and the optical fibers 3 (3a and 3b) are fixed to the package 2.

Also in this case, the configuration of holding the optical component 1 by the optical component holding parts 7 is formed to have the configuration of reducing heat conduction, whereby the small-sized optical fiber module with small electric power consumption can be realized. In addition, also in this case, at least a part of the package 2 is formed of a low water absorbing plastic having a water absorption of 0.024% or below, whereby the optical fiber module with long time reliability can be realized in which cracks will not generated by water absorption even under the high temperature, high humidity environment.

In the embodiments, the optical fibers 3 (3a and 3b) were connected to both ends of the optical component 1. However, it is acceptable that the optical fiber 3 is connected only to one end side of the optical component 1.

In the embodiments, the optical fibers 3 (3a and 3b) were optical fiber ribbons, but it is fine that the optical fiber adapted to the optical fiber module of the invention is a single optical fiber.

In the embodiments, the optical component 1 was the optical component 1 of the optical waveguide circuit having the circuit of the arrayed waveguide grating. However, the optical component adapted to the optical fiber module of the invention is not limited particularly, which can be set properly. For example, it is fine that the optical component is an optical waveguide circuit having a 1×8 optical waveguide circuit.

Moreover, it is fine to form the optical fiber module by adapting optical components other than the optical waveguide circuit. As examples of the optical components, there are optical components mainly formed of optical fibers such as an optical fiber coupler and an optical fiber grating, and optical components using an optical crystal and a multilayer filter.

In the first and second embodiments, the temperature control device 5 was the heater, and the temperature control device 5 was disposed in the bottom face of the optical component 1. However, it is acceptable that the temperature control device 5 is disposed in the top face of the optical component 1. Also in this case, it could be confirmed that the temperature control device 5 could be formed to have reduced electric power consumption with no difference from the temperature control device 5 being disposed in the bottom face of the optical component 1 and the optical fiber module excellent in mechanical strength could be realized.

The temperature control device 5 was configured to have the heater in the first and second embodiments, and the temperature control device 5 was configured to have the Peltier module in the third embodiment. However, the temperature control device 5 is not limited particularly, which can be set properly to adapt various configurations.

The package 2 was formed of polyphenylene sulfide resin in the first and second embodiments, and the cover part 2b of the package 2 was formed of polyphenylene sulfide resin in the third embodiment. However, in the optical fiber module of the invention, when at least a part of the package 2 is formed of a low water absorbing plastic having a water absorption of 0.024% or below, the characteristic deterioration of the optical fiber module due to water absorption can be suppressed. More specifically, the optical fiber module of the configuration can suppress the package deterioration due to water absorption even under the high temperature, high humidity environment, and it can suppress the characteristic deterioration of the optical component inside the package.

The optical fiber module capable of suppressing the package deterioration due to water absorption is the optical fiber module in which at least a part of the package 2 is formed of a resin having a main component of polyphenylene sulfide resin and mixed with a filler, for example.

The thermal conductivity of the low water absorbing plastic is not limited particularly, which can be set properly. However, the optical fiber module having the package 2 formed of a low water absorbing plastic having a main component of a small thermal conductivity such as polyphenylene sulfide resin can reduce the electric power consumption of the temperature control device 5.

What is claimed as new and is desired to be secured by Letters Patent of the United States is:

1. An optical fiber module comprising:
   a package;
   an optical component housed inside the package; and
   optical component holding parts disposed between the optical component and the package for holding the optical component,
   wherein a configuration of holding the optical component by the optical component holding parts has a configuration of reducing heat conduction for reducing the heat conduction between the optical component and the package.

2. The optical fiber module according to claim 1, wherein the configuration of reducing heat conduction is a configuration that the optical component holding parts hold the optical component in line contact.

3. The optical fiber module according to claim 2, wherein the optical component holding parts are formed to project from an inner wall side of the package toward an edge part side of the optical component, and
   projected tip end sides of the optical component holding parts are in line contact to edge parts of the optical component.

4. The optical fiber module according to claim 3, wherein the optical component holding parts has a block member,
   the block member has a slope formed on the projected tip end side of the optical component holding parts, and
   the slope is in line contact to the edge part of the optical component.

5. The optical fiber module according to claim 2, wherein the optical component holding parts are formed to project from an inner wall side of the package toward an edge part side of the optical component, slopes adjacent each other are formed on projected tip end sides of the optical component holding parts, and an edge line of the adjacent slopes is in line contact to a surface of the optical component.

6. The optical fiber module according to claim 2 comprising a temperature control device for controlling temperatures of the optical component.

7. The optical fiber module according to claim 6, wherein an electric power consumption of the temperature control device is five watts or below.

8. The optical fiber module according to claim 2, wherein the optical component holding parts are formed of members having a thermal conductivity of 0.9 W/(m·K) or below.

9. The optical fiber module according to claim 2, wherein one end side of at least one optical fiber is connected to the optical component and the other end side of the optical fiber is drawn out of the package to outside the package, an optical fiber retaining member is disposed in an area to draw an optical fiber of the package in a state not to be pulled out of the package, the optical fiber is fixed to the optical fiber retaining member, and the optical fiber retaining member and the package are allowed to relatively move in a longitudinal direction of the optical fiber.

10. The optical fiber module according to claim 2, wherein the optical component has an optical waveguide circuit in which a circuit of optical waveguides is formed over a substrate.

11. The optical fiber module according to claim 1, wherein the configuration of reducing heat conduction is a configuration that the optical component holding parts hold the optical component substantially in line contact, the optical component holding parts are formed to have elastic members, and the elastic members are configured to relax an impact applied to the optical component.

12. The optical fiber module according to claim 11, wherein the optical component holding parts are formed to project from an inner wall side of the package toward an edge part side of the optical component, and projected tip end sides of the optical component holding parts are substantially in line contact to edge parts of the optical component.

13. The optical fiber module according to claim 12, wherein the optical component holding parts have rubber elastic members of a U-shape in cross-section, a slope is formed on the projected tip end sides of the optical component holding parts by elastic deformation of the rubber elastic members, and the slope is in line contact to the edge part of the optical component.

14. The optical fiber module according to claim 12, wherein the optical component holding parts have a block member and a spring member disposed between the block member and the package, the block member has a slope formed on the projected tip end sides of the optical component holding part, and the slope is in line contact to the edge part of the optical component.

15. The optical fiber module according to claim 11 comprising a temperature control device for controlling temperatures of the optical component.

16. The optical fiber module according to claim 11, wherein the optical component has an optical waveguide circuit in which a circuit of optical waveguides is formed over a substrate.

17. An optical fiber module comprising:

a package; and an optical component housed inside the package, wherein at least a part of the package is formed of a low water absorbing plastic having a water absorption of 0.024% or below.

18. The optical fiber module according to claim 17, wherein a thermal conductivity of the low water absorbing plastic is 0.66 W/(m·K) or below.

19. The optical fiber module according to claim 17, wherein a main component of the low water absorbing plastic is polyphenylene sulfide resin.

20. The optical fiber module according to claim 17 comprising a temperature control device for controlling temperatures of the optical component.

21. The optical fiber module according to claim 17, wherein the optical component has an optical waveguide circuit in which a circuit of optical waveguides is formed over a substrate.

* * * * *